2,865,762
Patented Dec. 23, 1958

United States Patent Office

2,865,762
PUDDING MIX

Hans Neukom, Chicago, Ill., assignor to International Minerals & Chemical Corporation, a corporation of New York No Drawing. Application September 16, 1954
Serial No. 456,621

6 Claims. (Cl. 99—139)

This invention relates to a pudding mix composition, and more particularly, to a starch phosphate composition useful in the preparation of puddings.

It is desirable that a pudding be capable of preparation by a simple procedure and be ready to serve almost immediately upon mixing the pudding ingredients with the liquid constituent without any necessity for heating or cooling, and the like. A pudding composition upon mixing with a relatively cold liquid, such as cold whole milk, should "set-up" almost immediately and form a pudding having a firm body which is not heavy or pasty or starchy. A pudding should not weep or separate upon standing for extended periods of time. It is desirable that a pudding be free from tackiness or gummy characteristics and have a smooth, soft, even texture yielding superior eating qualities. The pudding compositions available commercially are deficient in many of these respects. There has been a need for a pudding composition capable of producing a pudding having all of the above properties and not requiring the addition of setting agents or mixes, as for example, Irish moss extract and/or salts, and the like, as additional additives in the preparation of the pudding.

It is an object of the instant invention to provide a starch phosphate composition suitable for preparing puddings.

It is also an object of the instant invention to provide a starch phosphate pudding mix suitable for preparing puddings and capable of producing puddings almost instantly upon mixing with cold whole milk.

Another object of the instant invention is to provide a starch phosphate composition or pudding mix suitable for preparing puddings without the use of setting agents, and/or salts, etc.

Still another object of this invention is to provide a starch phosphate composition or pudding mix suitable for preparing puddings which do not weep or separate upon standing for extended periods of time.

In accordance with this invention, there is prepared a composition for producing a pudding comprising sugar, flavoring and a cold-water swelling starch phosphate.

The starch phosphates of this invention are cold-water swelling alkali metal starch phosphates and are prepared by heating ungelatinized starch with an alkali metal phosphate. The phosphate is introduced into the starch granule by soaking the starch in an aqueous solution of the alkali metal phosphate. The resulting soaked starch granule is then separated from the solution, excess surface moisture is removed and the resulting material is heated at a temperature between about 120° C. and about 175° C. for from one to several hours. The heating is carried out either at atmospheric pressure or under vacuum, and is preferably carried out between about 140° C. and about 170° C. Temperatures higher than about 175° C. are generally avoided because dextrinization of the starch occurs at higher temperatures. At temperatures below 120° C. the reaction proceeds at too slow a rate to be feasible.

In preparing the starch phosphates of the instant invention, starch is treated with an aqueous solution of an alkali metal phosphate having a pH between about 4 and about 7. The phosphates which may be employed include sodium, potassium, and lithium phosphates. The phosphate solution having a pH between about 4 and about 7 is prepared by mixing an alkali metal phosphate or a combination of alkali metal phosphates in such proportion that the resulting solution has a pH between about 4 and about 7. For example, monosodium phosphate monohydrate and disodium phosphate dodecahydrate are combined in an aqueous solution in such proportion that the resulting phosphate solution has a pH between about 4 and about 7. The phosphate salts may be formed in situ in the solution, for example, the phosphate solution may be prepared by dissolving a basic phosphate salt, such as trisodium phosphate in water and adjusting the pH of the solution with phosphoric acid or monosodium phosphate to between about 4 and about 7. Alternatively, an aqueous solution of an acidic phosphate salt or of phosphoric acid is neutralized with sodium hydroxide, potassium hydroxide, or lithium hydroxide.

The starch phosphates of this invention are alkali metal starch phosphates containing at least about 1% phosphorous based on the weight of starch and usually between about 1% and about 5% phosphorus based on the weight of starch. These alkali metal starch phosphates also contain between about 1 and about 1.75 moles of bound alkali metal per mole of bound phosphorus, and preferably between about 1.4 and about 1.7 moles of bound alkali metal per mole of bound phosphorus.

The amount of phosphorus introduced into the starch molecule in the form of phosphate must amount to at least about 1% based on the weight of the starch if the alkali metal starch phosphate is to be cold-water swelling. The amount of phosphorus introduced into the starch molecule may be controlled by increasing or decreasing the concentration of the phosphate in the alkali metal phosphate solution or by regulating the temperature or time of heating. Treatment of starch with a one molar alkali metal phosphate solution having a pH between about 4 and about 7 under the conditions of this invention will produce a cold-water swelling starch phosphate containing about 1% phosphorus based on the weight of the starch if the reaction is allowed to go to completion. Cold-water swelling starch phosphates containing up to about 5% phosphorus in the form of phosphate can be prepared utilizing more concentrated alkali metal phosphate solutions. Cold-water swelling alkali metal starch phosphates containing between about 3% and about 5% phosphorus based on the weight of starch and between about 1.4 and about 1.7 moles alkali metal per mole of bound phosphorus are preferred in preparing the pudding composition of this invention. Puddings having superior setting and eating characteristics can be prepared from such starch phosphates without the addition of setting agents, and the like.

In preparing the cold-water swelling starch phosphate compounds of this invention, it is convenient to first prepare an alkali metal phosphate solution having a molarity with respect to phosphate ion of between about 1 and about 3. Starch is then added to the phosphate solution in an amount which will permit the formation of a slurry. Generally, the amount of starch added will amount to less than 1½ times the weight of the water present in the alkali metal phosphate solution and preferably will be less than the weight of the water present. The resulting slurry is agitated or stirred for at least about 5 minutes, usually about 10 minutes of stirring is sufficient for the starch granules to become soaked with the phosphate solution.

The swollen starch granules are separated from the phosphate solution, for example by filtration, and excess surface moisture is preferably removed, for example by drying in air or heating at a temperature below the point at which starch gelatinizes, for example at a temperature below about 45° C., depending upon the particular starch. The resulting granules which generally contain between about 8% and about 15% moisture content are then heated to a temperature between about 120° C. and about 175° C. for between about 1 hour and about 15 hours. The longer periods of heating are employed where the lower temperatures in the above range are used. Generally about 4 hours heating is sufficient time for the reaction to proceed to substantial completion when a temperature between about 140° C. and about 170° C. is employed.

The instant process is applicable to root starches, such as tapioca starch, potato starch, etc., cereal starches, such as corn starch, wheat starch, etc.; and their modification products, for example acid modified, oxidized, cross-linked starches or starch derivatives.

A specific procedure for preparing the cold-water swelling starch phosphates utilized in this invention involves preparing an aqueous solution of monosodium phosphate monohydrate having a molarity with respect to phosphate ion of between about 1 and about 3, and adding to the solution granular wheat starch in an amount equal to the weight of water in the solution. The slurry thus formed is agitated or stirred for between about 5 minutes and about 60 minutes, generally for about 10 minutes. Solid material is separated from the resulting slurry, for example by filtration, and the solid material is broken up and dried in the atmosphere. The dried material is then heated to a temperature between about 140° C. and about 170° C. for between about 1 hour and about 15 hours, preferably for about 4 hours, whereby the starch is reacted with the phosphate compound to produce an alkali metal starch phopshate which may be utilized in accordance with this invention to produce a pudding. While the starch phosphate thus produced may be utilized directly to produce a pudding, it is desirable to wash the starch phosphate with an aqueous solution of a water-soluble alcohol in order to remove any undesirable color or flavor therefrom. Methanol, ethanol, and other water-soluble alcohols are suitable for this purpose.

In accordance with a preferred procedure for preparing a starch phosphate utilizable in this invention, a 2 molar aqueous phosphate solution, prepared by dissolving in water one part of monosodium phosphate monohydrate and two parts disodium phosphate dodecahydrate, is mixed with about 1 mole of granular wheat starch, the amount of phosphate solution being such that the addition of starch results in the formation of a slurry. The pH of the phosphate solution is about 6.5. One mole of starch to about 500 grams of such a phosphate solution provides a slurry having a good workable consistency. The slurry is agitated for about 10 minutes to permit the starch to become soaked with phosphate solution, and solid material is then separated from the slurry by filtration. The solid material is broken up and dried in the atmosphere. The dried material is then heated to a tempearture between about 150° C. and about 165° C. for between about 1 hour and about 15 hours, preferably for between about 4 hours to about 6 hours, to produce a starch phosphate containing between about 3% and about 4% phophorus based on the weight of the starch. The starch phosphate thus produced is a cold-water swelling alkali metal starch phosphate which is eminently suitable for the preparation of puddings. This alkali metal starch phosphate may be utilized in the preparation of puddings without the addition of any setting agents, or the like. When such an alkali metal starch phosphate is mixed with sugar and flavoring, and the dry mixture added to cold whole milk, and allowed to stand, it sets up rapidly to form a smooth textured pudding of the excellent eating quality.

The following examples are specific embodiments of this invention illustrating the preparation of the cold-water swelling alkali metal starch phosphate compounds of this invention and the preparation of pudding mixes from these compounds. All parts and percentages are by weight unless otherwise indicated.

*Example I*

About 69 parts of monosodium phosphate monohydrate was dissolved in about 251 parts of water. The pH of the solution was about 4.3. To this solution was added about 180 parts of wheat starch and the resultant slurry was stirred for about 10 minutes and then filtered. The filter cake comprising swollen starch granules was dried in air and then heated at about 140° C. for about 3 hours. The resulting product was a cold-water swelling alkali metal starch phosphate. It was washed with an aqueous solution of methanol and analyzed. The washed product contained about 1% bound phosphorus and about 1 mole of sodium per mole of bound phosphorus. This starch phoshate gave a thin boiling clear solution when heated. The solution became turbid on cooling.

A dry mix suitable for preparing a pudding was prepared, utilizing the sodium starch phosphate prepared above, in accordance with the following formulation:

| | Parts |
|---|---|
| Sodium starch phosphate | 22 |
| Irish moss extract | 10 |
| Tetrasodium pyrophosphate | 1 |
| Calcium acetate | 0.5 |
| Sodium chloride | 0.5 |
| Cane sugar | 65 |
| Vanilla flavoring | 0.25 |

Forty-eight parts of the above mix was combined with 170 parts of cold whole milk and mixed for about 4 minutes at slow speed on a conventional kitchen mixer. The mixture was then poured into bowls and allowed to chill for about 10 to 30 minutes. The mixture set rapidly to a firm set and did not separate or weep after standing for 2 days. The pudding was smooth textured and of excellent eating quality.

*Example II*

About 103.5 parts monosodium phosphate monohydrate and 201 parts disodium phosphate dodecahydrate were dissolved in about 195.5 parts water. The pH of the solution was about 6.1. About 180 parts of wheat starch was added to the solution and the resulting slurry was stirred for about 10 minutes and filtered. The filter cake was broken up, dried in air, and the dried starch was heated for about 5 hours in a vacuum oven at a temperature of about 160° C. The product obtained was a cold-water swelling sodium starch phosphate containing about 5.1% phosphorus. This starch phosphate gave a thin boiling clear solution when heated, which solution became turbid upon cooling. The starch phosphate was washed with alcohol and analyzed for phosphorus and sodium content. It contained 5.1% bound phosphorus in the form of phosphate and about 1.5 moles of sodium per mole of bound phosphorus.

*Example III*

About 46 parts monosodium phosphate monohydrate and 178 parts disodium phosphate dodecahydrate were dissolved in about 276 parts water. The solution had a pH of about 6.5. About 180 parts of wheat starch was added to the solution and the resulting slurry was stirred for about 10 minutes and filtered. The filter cake was broken up and dried in air and the dried starch was heated for about 5 hours at about 160° C. The product obtained was cold-water swelling. After washing with alcohol, the product was analyzed and found to contain about 3.7% bound phosphorus in the form of phosphate and about 1.66 moles of sodium per mole of bound phosphorus.

*Example IV*

Twenty parts each of the sodium starch phosphate products prepared in Examples II and III was mixed separately with 64 parts cane sugar and 16 parts cocoa. Each of the mixtures was added to one pint of cold whole milk and allowed to stand. The puddings set up very rapidly and did not weep or separate after standing for 48 hours. The puddings were firm and smooth and had superior eating characteristics.

This application is a continuation-in-part of application Serial No. 378,666, filed September 4, 1953, by applicant, and entitled Process for the Production of Modified Starches.

Having thus fully described and illustrated the character of the instant invention, what is desired to be secured by Letters Patent is:

1. A composition suitable for preparing a pudding comprising sugar, flavoring, and a cold-water swelling alkali metal starch ortho phosphate containing between about 1% and about 5% bound phosphorus based on the weight of starch and between about 1.0 and about 1.75 moles of alkali metal per mole of bound phosphorus, prepared by commingling dry, ungelatinized starch with an aqueous solution containing an orthophosphate salt of an alkali metal and having a pH between about 4 and about 7, removing unabsorbed liquid from the treated starch at a temperature below that at which the starch gelatinizes, and heating the treated starch at a temperature between about 120° C. and about 175° C. until the reaction has proceeded to substantial completion.

2. The composition of claim 1 in which the alkali metal starch ortho phosphate contains between about 3% and about 5% bound phosphorus based on the weight of starch and between about 1.4 and about 1.7 moles of alkali metal per mole of bound phosphorus.

3. A composition suitable for preparing a pudding comprising sugar, flavoring, and a cold-water swelling potassium starch ortho phosphate containing between about 1% and about 5% bound phosphorus based on the weight of starch and between about 1.0 and about 1.75 moles of potassium per mole of bound phosphorus, prepared by commingling dry, ungelatinized starch with an aqueous solution containing a potassium orthophosphate salt and having a pH between about 4 and about 7, removing unabsorbed liquid from the treated starch at a temperature below that at which the starch gelatinizes, and heating the treated starch at a temperature between about 140° C. and about 170° C. for about 1 to about 15 hours.

4. The composition of claim 3 in which the potassium starch orthophosphate contains between about 3% and about 5% bound phosphorus based on the weight of starch and between about 1.0 and about 1.75 moles of potassium per mole of bound phosphorus.

5. A composition suitable for preparing a pudding comprising sugar, flavoring, and a cold-water swelling sodium starch orthophosphate containing between about 1% and about 5% bound phosphorus based on the weight of starch and between about 1.0 and about 1.75 moles sodium per mole of bound phosphorus, prepared by commingling dry, ungelatinized starch with an aqueous solution containing a sodium orthophosphate salt and having a pH between about 4 and about 7, removing unabsorbed liquid from the treated starch at a temperature below that at which the starch gelatinizes, and heating the treated starch at a temperature between about 140° C. and about 170° C. for about 1 to about 15 hours.

6. The composition of claim 5 in which the sodium starch orthophosphate contains between about 3% and about 5% bound phosphorus based on the weight of starch and between about 1.0 and about 1.75 moles sodium per mole of bound phosphorus.

References Cited in the file of this patent

UNITED STATES PATENTS

| | | |
|---|---|---|
| 2,252,479 | Beyer | Aug. 12, 1941 |
| 2,257,599 | Frischmuth et al. | Sept. 30, 1941 |
| 2,314,459 | Salzburg | Mar. 23, 1943 |
| 2,461,139 | Caldwell | Feb. 8, 1949 |
| 2,575,352 | Lohmar | Nov. 20, 1951 |
| 2,590,912 | Yarber | Apr. 1, 1952 |

FOREIGN PATENTS

| | | |
|---|---|---|
| 70,237 | Switzerland | May 8, 1913 |